(12) United States Patent
Best Wright

(10) Patent No.: US 6,588,365 B2
(45) Date of Patent: Jul. 8, 2003

(54) PET BOOSTER SEAT SYSTEM AND METHOD

(76) Inventor: M. Christine Best Wright, 3624 Bay Road South Dr., Indianapolis, IN (US) 46240

( * ) Notice: Subject to any disclaimer, the term of this patent is extended or adjusted under 35 U.S.C. 154(b) by 0 days.

(21) Appl. No.: 09/800,324

(22) Filed: Mar. 6, 2001

(65) Prior Publication Data

US 2001/0042516 A1 Nov. 22, 2001

Related U.S. Application Data

(60) Provisional application No. 60/187,522, filed on Mar. 7, 2000.

(51) Int. Cl.[7] ............................................... A01K 29/00
(52) U.S. Cl. ..................................................... 119/28.5
(58) Field of Search ............................ 119/28.5, 1, 96, 119/771, 165, 673, 671; 297/130, 487

(56) References Cited

U.S. PATENT DOCUMENTS

| | | | |
|---|---|---|---|
| 3,465,930 A | 9/1969 | La Croix | 224/42.42 |
| D245,716 S | 9/1977 | Russo | D30/6 |
| 4,512,286 A * | 4/1985 | Rux | 119/771 |
| 4,597,359 A | 7/1986 | Moorman | 119/1 |
| 4,743,063 A * | 5/1988 | Foster, Jr. | 297/130 |
| 5,123,377 A | 6/1992 | Edwards | 119/28.5 |
| 5,479,892 A * | 1/1996 | Edwards | 119/771 |
| 5,487,361 A | 1/1996 | Dean | 119/28.5 |
| 5,533,785 A | 7/1996 | Gould | 297/250.1 |
| 5,551,373 A * | 9/1996 | O'Donnell | 119/28.5 |
| D376,447 S | 12/1996 | Stump | D30/144 |
| 5,601,334 A * | 2/1997 | Marks | 297/233 |
| 5,685,258 A | 11/1997 | Fricano | 119/28.5 |
| 5,718,191 A * | 2/1998 | O'Donnell | 119/771 |
| 5,774,909 A * | 7/1998 | Stable | 119/673 |
| 5,785,003 A | 7/1998 | Jacobson et al. | 119/496 |

* cited by examiner

Primary Examiner—Peter M Poon
Assistant Examiner—Bethany L Griles
(74) Attorney, Agent, or Firm—Woodard, Emhardt, Moriarty, McNett & Henry LLP

(57) ABSTRACT

One preferred embodiment of the present invention includes a pet booster seat mountable on the seat of a vehicle. The booster seat includes a frame member with a height, an open top, and an interior area. At least two restraining belt openings are defined in the frame member, and at least one strap attachment point is defined on the frame member. A cushion is placed and held in the interior of the frame member, where the cushion preferably has a height substantially equal to or less than the height of the frame member. At least one harness strap is attached to a strap attachment point on the frame member. In one embodiment, a frame cover is removably mounted over the open top of the frame member.

4 Claims, 6 Drawing Sheets

PET BOOSTER SEAT SYSTEM AND METHOD

CLAIM TO PRIOR APPLICATION

This application claims priority to provisional application Ser. No. 60/187,522, filed on Mar. 7, 2000, which is hereby incorporated herein by reference.

FIELD OF THE INVENTION

This invention relates generally to booster seats for pets, and more particularly to a booster seat, system and method for restraining a pet on a vehicle seat for transport while maintaining the pet's comfort and safety.

BACKGROUND OF THE INVENTION

With the popularity of pets and the desire to travel short or long distances, it is common for pet owners to transport their pets on a seat in a car, van, truck, SUV or similar passenger vehicle. Small pets, for example with a weight of about twenty (20) pounds or less, are often dogs, cats, rabbits or guinea pigs.

Unless caged or held, these pets often have a tendency to move about in the vehicle to obtain attention or for comfort. Additionally, due to their small size, they often move or jump in attempts to see out the vehicle windows. This can distract the driver and/or interfere with the driver's operation of the vehicle, raising the potential for a vehicular accident. Restraint systems designed for humans in such vehicles are at best ineffective in restraining such pets, and at worst could injure the pet further in the event of an accident or sudden stop. Accordingly, there is a need for an improved system and method for restraining pets on a vehicle seat during transport.

Additionally, in the unfortunate event of a vehicular accident or sudden stop, the deceleration forces can cause objects, particularly small objects, to be thrown through the air. If a pet is catapulted in such a manner, it can potentially injure the pet and/or the object or person the pet strikes. Accordingly, there is a need to restrain pets from free movement during an impact or sudden stop. Simultaneously, the restraints should not be too confining because a rigid restraint system can transmit deceleration forces directly to the pet, potentially causing additional injury. Thus, a pet restraint system needs to provide sufficient restraint while providing a resilient and force absorbing system to minimize the potential for injury.

Some pet booster seats and restraint systems have been taught or suggested in the prior art without providing all of the benefits and advantages of the present invention.

SUMMARY OF THE INVENTION

One preferred embodiment of the present invention includes a pet booster seat mountable on the seat of a vehicle. The booster seat includes a frame member with a height, an open top and an interior area. Restraining belt openings are defined in the frame member, and at least one strap attachment point is located on the frame member. A cushion is placed and held in the interior of the frame member, where the cushion has a cross-section matching the frame member and a height preferably substantially matching or slightly less than the height of the frame member. At least one harness strap is attached to a strap attachment point on the frame member. In an alternate embodiment, a frame cover is removably mounted over the open top of the frame member.

One preferred object of the present invention includes minimizing the range of movement for a pet on a vehicle seat while maximizing comfort.

Another preferred object of the present invention is to raise a pet to allow it to see out a vehicle's windows.

A further preferred object of the present invention is to provide a safety restraint system for a pet to prevent the pet from being thrown during a vehicular accident and to absorb a portion of deceleration force applied to the pet in the event of an accident.

Further objects, features and advantages of the present invention shall become apparent from the detailed drawings and descriptions provided herein.

DESCRIPTION OF PREFERRED EMBODIMENTS

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

Illustrations of preferred embodiments of the present invention are shown in FIGS. 1–6. The present invention provides a booster seat for a small pet to be restrained safely and comfortably on a vehicle seat. The booster seat preferably enables the pet to view the surrounding area through the vehicle windows and prevents the pet from moving unrestrained around the interior of the vehicle, where it could potentially be injured or distract the driver. The pet wears a harness and is restrained using relatively loose harness straps which extend from the booster seat and attach to the harness, allowing the pet to adjust its position for comfort. The booster seat additionally absorbs some deceleration force and keep the pet from being thrown in the case of an impact or sudden stop. The booster seat is held on the seat by a restraining strap or belt, such as seatbelt or vehicle tie-downs.

Figure 1:
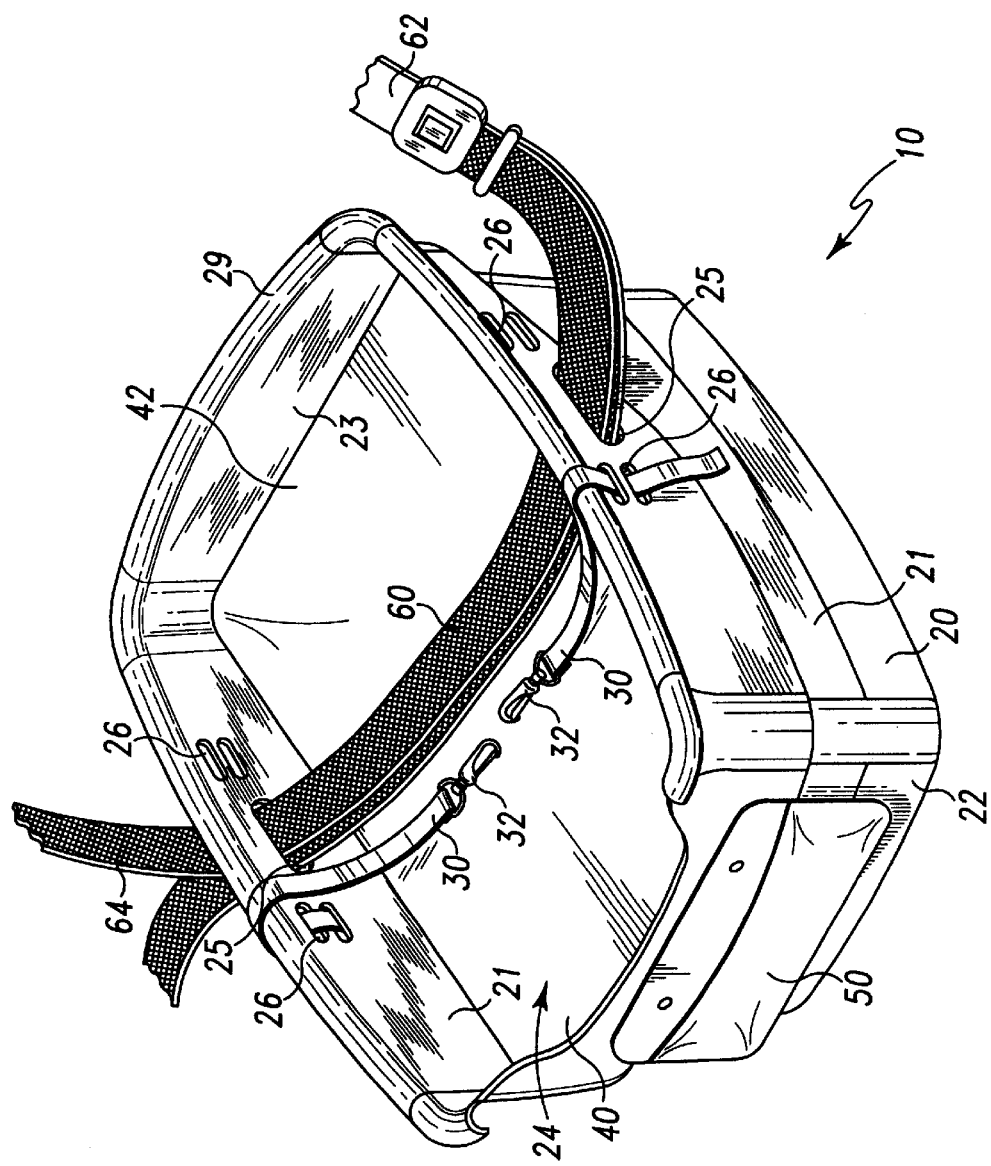
FIG. 1 is a perspective illustration of a booster seat and restraint system according to one preferred embodiment of the present invention.
Figure 2:
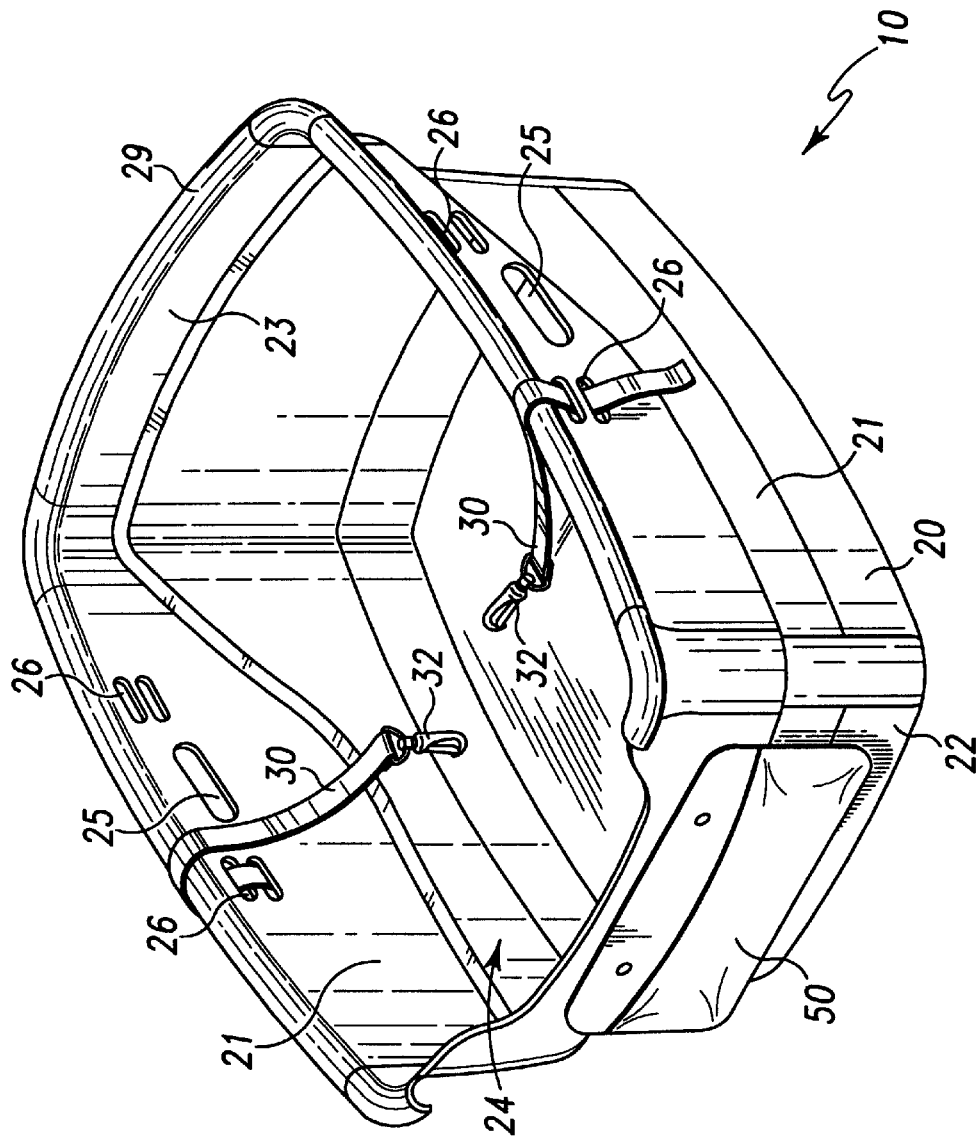
FIG. 2 is a perspective illustration of the booster seat illustrated in FIG. 1 with the cushion removed.
Figure 3:
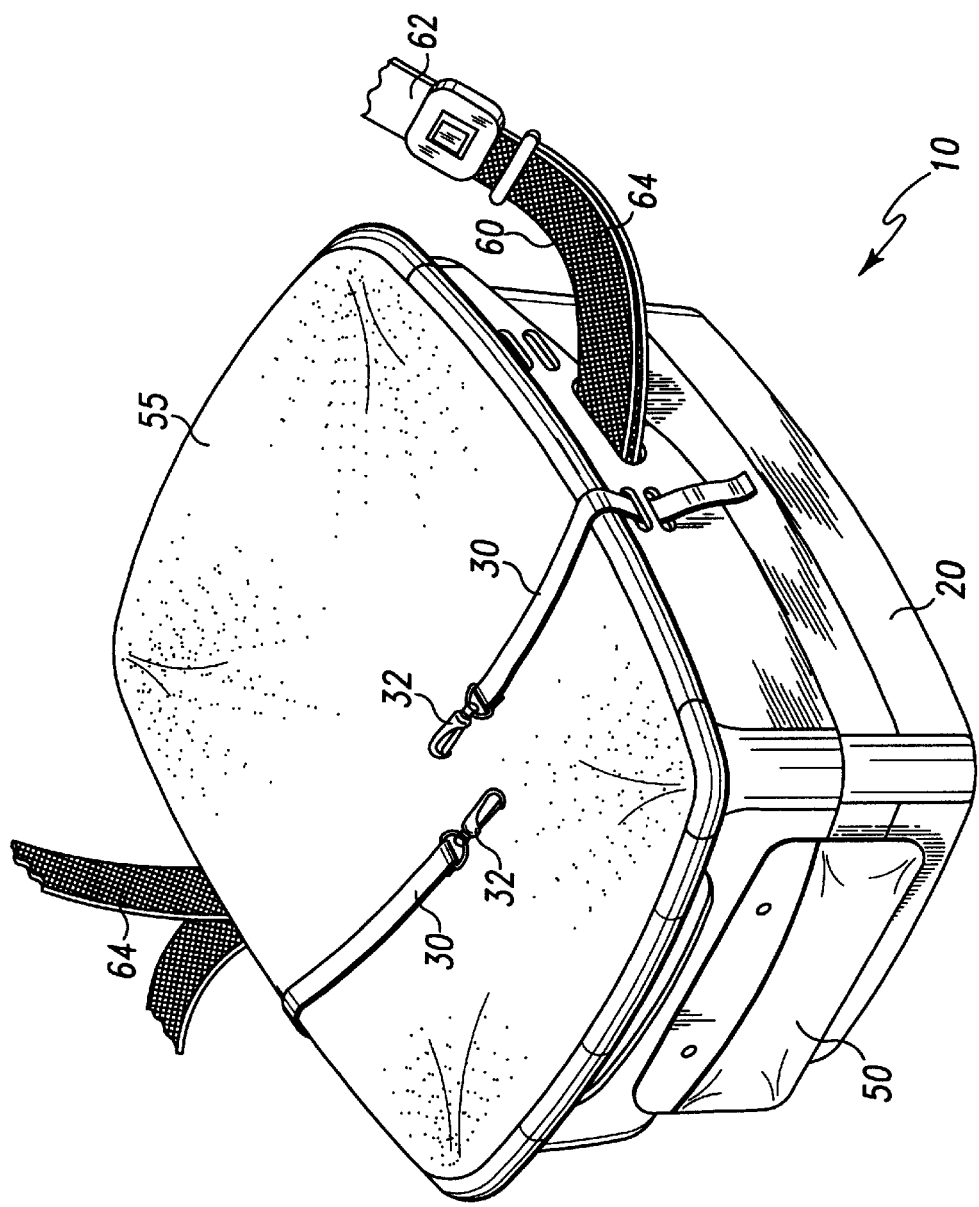
FIG. 3 is a perspective illustration of an alternate embodiment of the booster seat illustrated in FIG. 1 with a removable frame cover.

FIGS. 1–3 illustrate one preferred embodiment of the present invention from a perspective view. Booster seat 10 includes frame member 20 which has opposing side walls 21, front panel 22 and rear panel 23. Frame member 20 defines an interior area 24 within the side walls and panels. Frame member 20 preferably has an open top. The side walls, front panel and rear panel define open top edge 29 defining the circumference of interior area 24. Frame member 20 may optionally include a bottom panel.

In this embodiment, restraining belt apertures 25 are defined in the opposing side walls 21 of frame member 20. Frame member 20 further defines at least one strap attachment point 26 to which harness straps may be attached. FIGS. 1 and 2 illustrate four strap attachment points 26 comprised of two slot-apertures each. An optional storage pocket 50 for food, treats or supplies, may be attached to frame member 20.

The frame member has a top-down cross-section in a standard shape such as a square, rectangle, oval, circle, etc. Preferably the lower edge of frame member 20 is contoured to be placed directly on a vehicle seat with a shape designed to minimize sliding or tipping, for example with outwardly-flared sides to form a broad base. Also preferably, frame member is curled over at the open top edges 29 to form a blunt upper surface and a downward facing edge. This protects the pet by providing a blunt upper surface in case of impact, while also functioning as a handle for carrying frame member 20 and/or providing a rim for a frame cover. Frame member 20 is preferably lightweight for ease of transport and can be made from a rigid molded or injected plastic, or other conventional materials such as wood, metal or reinforced cardboard. Other materials can be used, as will be understood by those of skill in the art.

Booster seat 10 includes a cushion 40 which may be placed in interior area 24 of frame member 20. In one preferred embodiment, cushion 40 has a cross-section and height approximately matching the cross-section and height of frame member 20. Cushion 40 is preferably made from a compressible, resilient material such as a soft to medium hardness foam block. Less preferred materials include rigid foam, feathers, foam pellets, cloth or shredded paper which may be used as stuffing. The cushion includes a cushion cover surrounding the compressible material to enhance its durability and to simplify cleaning. One preferred material for the cushion cover is vinyl.

Removable cushion 40 is shown in place in FIG. 1 and not shown in FIG. 2. In one embodiment, the top surface 42 of cushion 40 is substantially coplanar with the open top of frame member 20. In an alternate embodiment, top surface 42 is slightly below the height of frame member 20 so that the upper portions of side panels 21, rear panel 23 and front panel 22 provide a slight rise to encourage a pet to remain on booster seat 10. In a further alternate embodiment, cushion 40 could be made in one or more layers allowing the pet owner to stack the layers to select a desired top surface height.

Harness straps 30 are attached to frame member 20 at attachment points 26. In a preferred embodiment, attachment points 26 are formed with two similarly sized slots in frame member 20 to create a buckle type of connection with the strap. With this type of attachment, the length of the harness straps can be selectively adjusted by the pet's owner, but the attachment point provides sufficient friction to prevent sliding of the harness straps when merely pulled by a pet or in case of an accident. Alternate attachment methods include snaps, buttons, zippers, knots, hook and loop fasteners, rivets, mounting pins, bolts or screws, staples and other attachment methods well known in the art.

Harness straps 30 terminate in clips 32, such as hooks, loops or clasps, which can be selectively attached to the pet's harness. Booster seat 10 includes at least one harness strap 30, but preferably has two or more. The harness strap(s) preferably have a length allowing the pet some room for movement on booster seat 10, but prevent the pet from leaving the booster seat's top area. Harness straps 30 preferably have some elasticity to absorb force in case of an accident or sudden stop. Harness straps 30 can be made from conventional known strap materials such as cotton, nylon, lycra, cable, leather, or rope. Although the harness straps can be connected to a pet's collar, this is a less preferred alternative due to the risk of choking or neck or spinal trauma in the event of an accident.

As illustrated in FIG. 3, a cover 55 can be placed over the open top of frame member 20. Cover 55 is preferably made of a material comfortable to the pet which also provides a frictional surface to prevent sliding. Cover 55 conceals cushion 40 and interior area 24 of frame member 20 and also simplifies cleaning. The cover is preferably removable and washable and may be taut or have elastic properties. Example cover materials are synthetic fleece, cotton, sheepskin, polyester, lycra, plastic or vinyl. Similar well-known materials with the necessary strength and elasticity to support a pet in combination with cushion 40 may be used. Cover 55 is held in place around the open top of frame member 20 using an elastic border, snaps, buttons, a zipper, Velcro® hook and loop fasteners, a drawstring border or by other standard attachment means.

As illustrated in FIGS. 1 and 3, a restraining belt 60 is disposed through restraining belt apertures or openings defined in the sides of frame member 20. Restraining belt 60 can be a tie-down or similar restraint, but is preferably a standard seat belt provided in a vehicle. Restraining belt 60, when using a conventional three-point seat belt, includes a first belt section 62 such as a buckle connected adjacent the seat and a second belt section 64, such as a shoulder and/or lap belt connected adjacent the seat and including a sliding engagable tab. First belt section 62 and second belt section 64 can be connected using a conventional tab and buckle arrangement. When in use, a section of the restraining belt is disposed, threaded or maneuvered through restraining belt apertures 25, with a portion of the belt preferably lying flat on top surface 42 of cushion 40. Alternatively, belt 60 could be threaded through cushion 40 as well.

Figure 4:
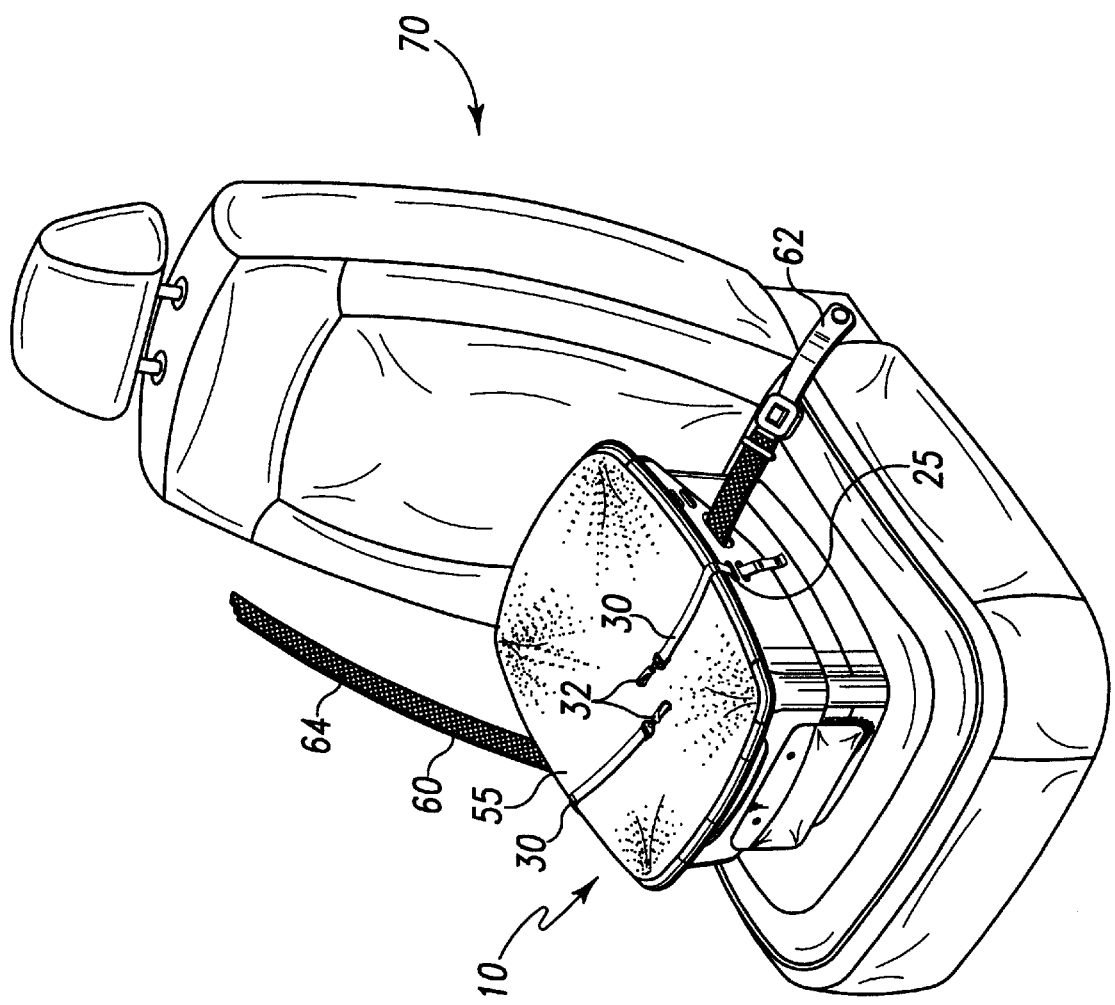
FIG. 4 is a perspective illustration of the booster seat illustrated in FIG. 3 mounted on a vehicle seat.

FIG. 4 shows the preferred embodiment shown in FIG. 1 in use on a vehicle seat 70. Vehicle seat 70 is a conventional single or bench seat and includes a lap portion and a back portion. A conventional three-point seat belt is mounted adjacent seat 70. Frame member 20 of booster seat 10 is placed on the lap portion of seat 70 adjacent the back portion. Second belt section 64 is then threaded through restraining belt apertures 25 and connected to first belt section 62. Restraint belt 60 is then tightened by retraction or cinching to hold booster seat 10 in place on vehicle seat 70. Cover 55 may optionally be placed over the open top of frame member 20. A pet wearing a harness is then placed on top of booster seat 10, and on cover 55 if it is used. Harness straps 30 are then removably connected to the pet harness and adjusted in length to allow the pet some movement while to restrain the pet on top of booster seat 10.

Cushion 40 is preferably placed within frame member 20 and preferably has a height substantially matching or slightly less than the height of frame 20 so that cover 55 lies across top surface 42 of cushion 40. In use, the pet's weight is supported by cushion 40 and/or cover 55. In the event of a vehicle accident or sudden stop, harness straps 30 preferably incorporate some stretch properties to absorb deceleration forces and minimize any "jerk" transmitted to the pet. Additionally, cushion 40 will absorb some deceleration force.

Figure 5:
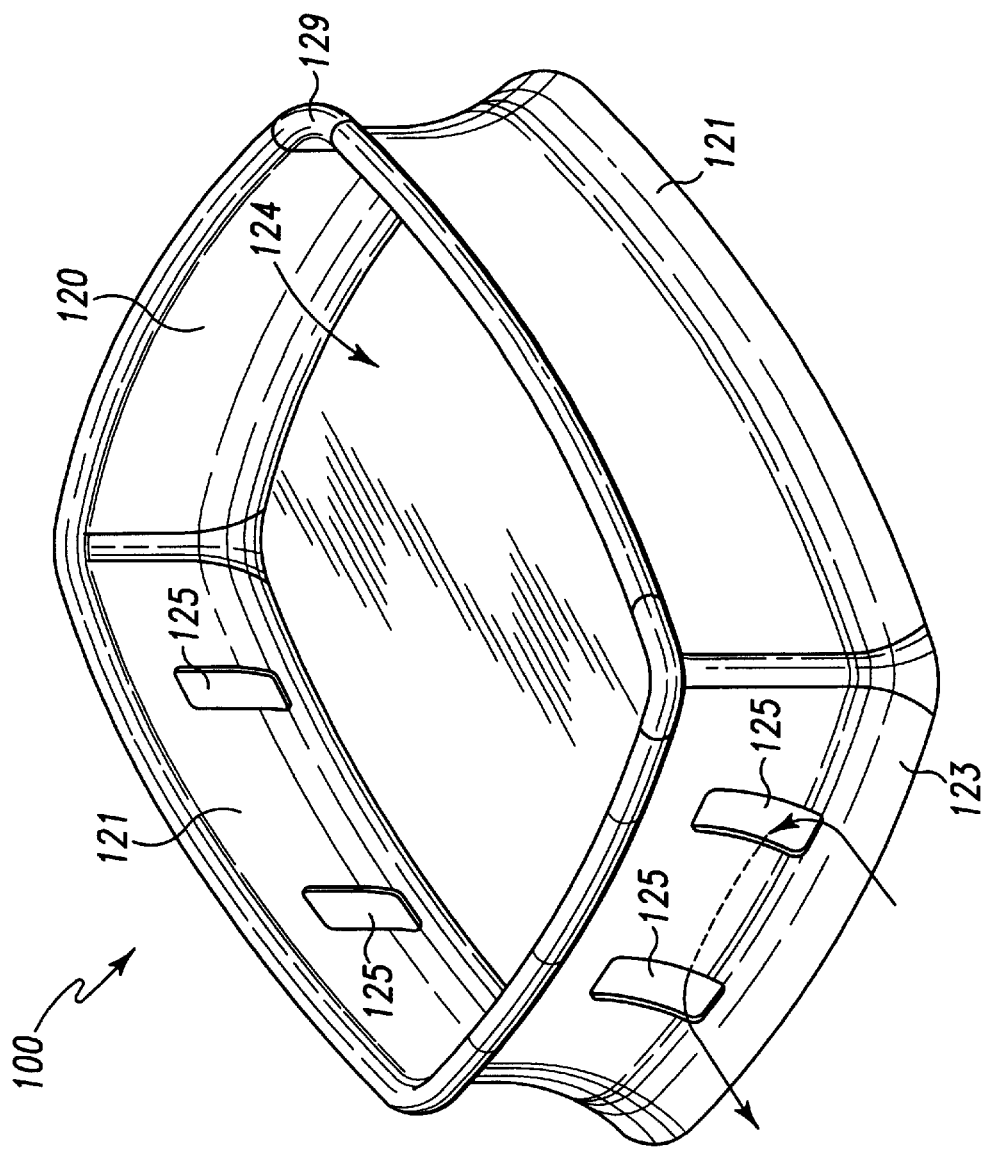
FIG. 5 is a perspective illustration of an alternate embodiment of the present invention.
Figure 6:
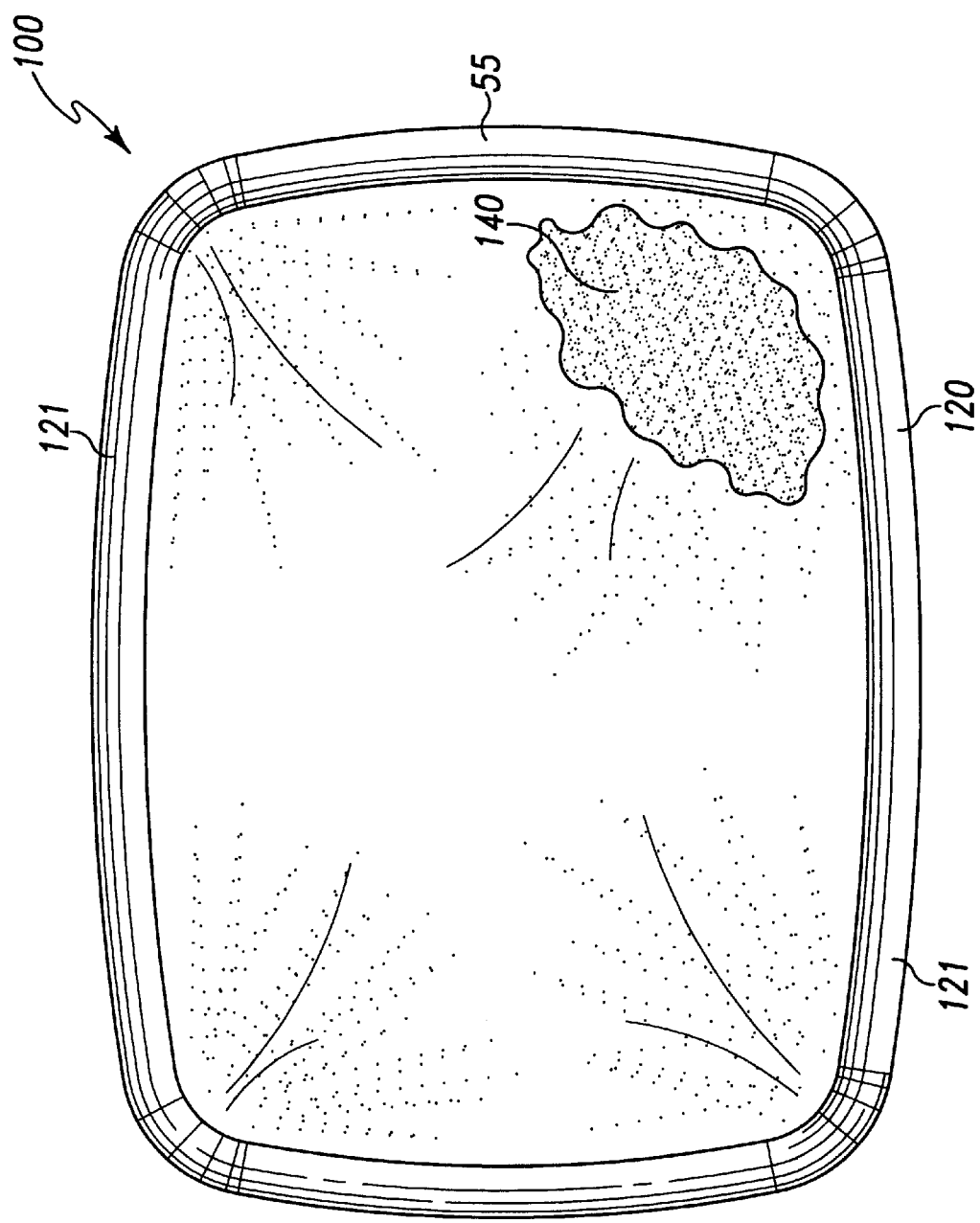
FIG. 6 is a top-down view of the alternate embodiment of the present invention illustrated in FIG. 5.

FIGS. 5 and 6 illustrate an alternate preferred embodiment 100 of booster seat 10. Booster seat 100 illustrates that belt restraint apertures 125 in frame 120 can be sized and defined in a side panel 121 or a rear panel 123 of frame 120 allowing frame 120 to be placed on the lap portion of the seat in different directions. An arrow illustrates one method in which the restraining belt can be threaded through apertures 125. Preferably, in use a cushion 140 is placed in interior area 124 of frame 120. Cushion 140 is shown as a cut-away section in FIG. 6. A frame cover 55 can be used with booster seat 100 and secured around the blunt upper edge 129 of frame 120. Additionally, frame 120 can be contoured and tapered, for example with outwardly flared sides to provide a broader base for stability. The height of frame 120 may also be tapered along the length of the side panels to correspond to or compensate for any a slant in the lap portion of the seat. According to alternate embodiments, the top surface of booster seat 100 may be flat or include a slight rise when placed on the lap portion of the seat.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A pet booster seat mountable on the seat of a vehicle, comprising:
    a frame member with a height, an open top and defining an interior area, wherein at least two restraining belt openings are defined in said frame member;
    at least one strap attachment point defined on said frame member;
    a cushion placed in said interior area of said frame member, wherein said cushion has a height substantially equal to or less than the height of said frame member;
    at least one harness strap attached to said at least one strap attachment point;
    a frame cover removably mounted over said open top of said frame member;
    wherein said frame member includes opposing side panels and wherein said at least two restraining belt apertures are defined in said side panel;
    wherein said frame member includes at least one rear panel and wherein said at least two restraining belt apertures are defined in said rear panel;
    wherein said at least one strap attachment point is comprised of two slot apertures defined in said frame member;
    wherein the material for said frame cover is selected from synthetic fleece, cotton, sheepskin, polyester, lycra, plastic or vinyl;
    wherein said frame cover is removably mounted over said open top of said frame member using at least one of an elastic border, snaps, buttons, a zipper, hook and loop fasteners or a drawstring border;
    wherein said cushion is comprised of a compressible, resilient interior foam material surrounded by a cushion cover;
    wherein said frame member includes a top edge, and wherein said top edge is curled to present a blunt upper surface; and
    a storage pocket attached to said frame member wherein said storage pocket is removably attached to said frame member.

2. A pet booster seat system comprising:
    a seat in a vehicle and a restraining belt mounted adjacent said seat, wherein said restraining belt is configured to be tightened and includes a first belt section selectively attachable to a second belt section;
    a booster seat frame member configured to be placed on said seat, wherein said frame member has a height and defines an open top and an interior area;
    wherein said frame member defines restraining belt openings through which said restraining belt is disposed and tightened;
    wherein said frame member defines at least one harness strap mounting point; at least one harness strap mounted to said harness strap mounting point;
    a cushion held in said interior area of said frame member, said cover being removably mounted over said open top of said frame member, and
    wherein said frame member further includes a lower edge tapered to match the surface of the vehicle seat and;
    said frame member has a height of between about 8 inches and about 12 inches.

3. A method for restraining a pet on the lap portion of a seat within a vehicle, comprising the steps of:
    a) placing a booster seat frame member on the lap portion of a seat within a vehicle, where in said frame member includes a defined interior area and an open top and harness straps and wherein said vehicle includes a restraining belt mounted adjacent to said seat;
    b) placing a cushion within said interior area of said booster seat frame member wherein said cushion has a top surface with a height substantially matching the height of said frame member;
    c) disposing said restraining belt through apertures defined in said frame member;
    d) tightening said restraining belt to hold said frame member on said seat;
    e) placing a pet wearing a harness on said top surface of said cushion;
    f) attaching said harness straps to the harness on the pet; and
    wherein said restraining belt is disposed to lie flat across said top surface of said cushion.

4. The method of claim 3 further comprising the step of removably mounting a resilient frame cover over said open top of said frame member prior to placing a pet on said top surface of said cushion, wherein said frame cover is oriented to lie across said top surface of said cushion.

* * * * *

UNITED STATES PATENT AND TRADEMARK OFFICE
CERTIFICATE OF CORRECTION

PATENT NO. : 6,588,365 B2
DATED : July 8, 2003
INVENTOR(S) : Best Wright

It is certified that error appears in the above-identified patent and that said Letters Patent is hereby corrected as shown below:

<u>Column 1,</u>
Line 33, replace "(luring" with -- during --.

Signed and Sealed this

Seventh Day of October, 2003

JAMES E. ROGAN
*Director of the United States Patent and Trademark Office*